United States Patent [19]

McWilliams et al.

[11] 3,996,032

[45] Dec. 7, 1976

[54] INSULATED HEATER TRAY FOR MAKING GLASS FIBERS AND METHOD FOR USING SAME

[75] Inventors: Donald E. McWilliams, Pittsburgh; William L. Schaefer, Gibsonia, both of Pa.

[73] Assignee: PPG Industries, Inc., Pittsburgh, Pa.

[22] Filed: Dec. 8, 1975

[21] Appl. No.: 638,481

[52] U.S. Cl. .................................. 65/3 C; 34/164; 65/4 R; 65/9; 65/11 R; 198/609; 432/235

[51] Int. Cl.[2] .......................................... C03C 37/02

[58] Field of Search ............... 198/220 A; 432/235; 65/2, 3 C, 3 R, 11 R, 4 R, 9; 34/164

[56] References Cited

UNITED STATES PATENTS

| | | | |
|---|---|---|---|
| 2,157,716 | 5/1939 | Muller | 34/164 X |
| 3,089,253 | 5/1963 | Evans | 34/164 |
| 3,258,852 | 7/1966 | White | 34/164 |
| 3,869,268 | 3/1975 | Briar et al. | 65/2 |

*Primary Examiner*—Robert L. Lindsay, Jr.
*Attorney, Agent, or Firm*—Alan T. McDonald

[57] ABSTRACT

An improved method and apparatus for forming chopped glass fiber strands is disclosed. The improvement comprises a vibratory conveyor under a drying apparatus for said glass fiber strands which is insulated such that cold spots do not develop on the tray adjacent the glass fiber strands. Preferably, the tray is formed of two sections, one inside the other, having an airspace therebetween along their lengths and having a spacer between the lips of the sections.

9 Claims, 2 Drawing Figures

INSULATED HEATER TRAY FOR MAKING GLASS FIBERS AND METHOD FOR USING SAME

BACKGROUND OF THE INVENTION

In U.S. Pat. No. 3,869,268, herein incorporated by reference, a method and apparatus for forming chopped glass fiber strand is disclosed. As the glass strand is chopped, it passes along a series of two vibratory conveyors, the first of which vibrates at an amplitude greater than the second. The second vibratory conveyor is a tray which passes under a drying apparatus, such as an infrared dryer, a gas oven, an electric oven and the like. The drying apparatus heats the vibratory conveyor as it dries the glass strand. This drying is important, since all of the glass fibers have been previously coated with a lubricant binder and/or size. The lubricants employed are normally thermoplastic and harden when cooled. The heat along the tray maintains the binder in such a condition that it will not stick to the tray.

In the formation of the tray, reinforcing ribs and connections to the vibrators are located at the bottom of the tray. These ribs are made of steel and are welded directly to the bottom of the tray. Being constructed of metal, these ribs act as heat sinks and tend to draw heat away from the tray at their connections to the tray. With certain binders, such a cooling of the tray at those points resulted in sticking of the chopped glass fiber strand to the tray at these heat sinks, thus clogging the tray and adversely affecting production in such a manner that these binders could not be used in forming chopped glass fiber strand by this method. It is desirable, therefore, to eliminate any such sticking problem so that all binders can successfully be employed on the glass strand produced by the method of U.S. Pat. No. 3,869,268.

In U.S. Pat. Nos. 3,133,628 and 3,191,763 a composite insulated vibratory tray is shown, however, this tray includes spacer elements 27 between the trays which would act as heat sinks and thus be unsatisfactory for use in the present invention.

THE PRESENT INVENTION

By means of the present invention, it has been found that by insulating the tray employed in the above-identified patent, sticking of chopped glass fiber strand to the tray can be eliminated. Insulation of the tray can be accomplished by placing insulation material, such as fiber glass, along each of the individual steel reinforcing ribs. However, in the preferred embodiment, insulation of the tray is accomplished by use of a composite tray formed in two sections. The sections are located one on top of the other and have an air space therebetween along their lengths. The lips of the two sections have spacers between them to provide the requisite air space between the two sections. The steel reinforcing ribs are then welded to the bottom section. The air space between the sections insulates the upper section from the reinforcing rib's action as a heat sink and sticking of glass fiber strand to the composite tray is thereby eliminated.

DETAILED DESCRIPTION OF THE DRAWINGS

Figures 1, 2:
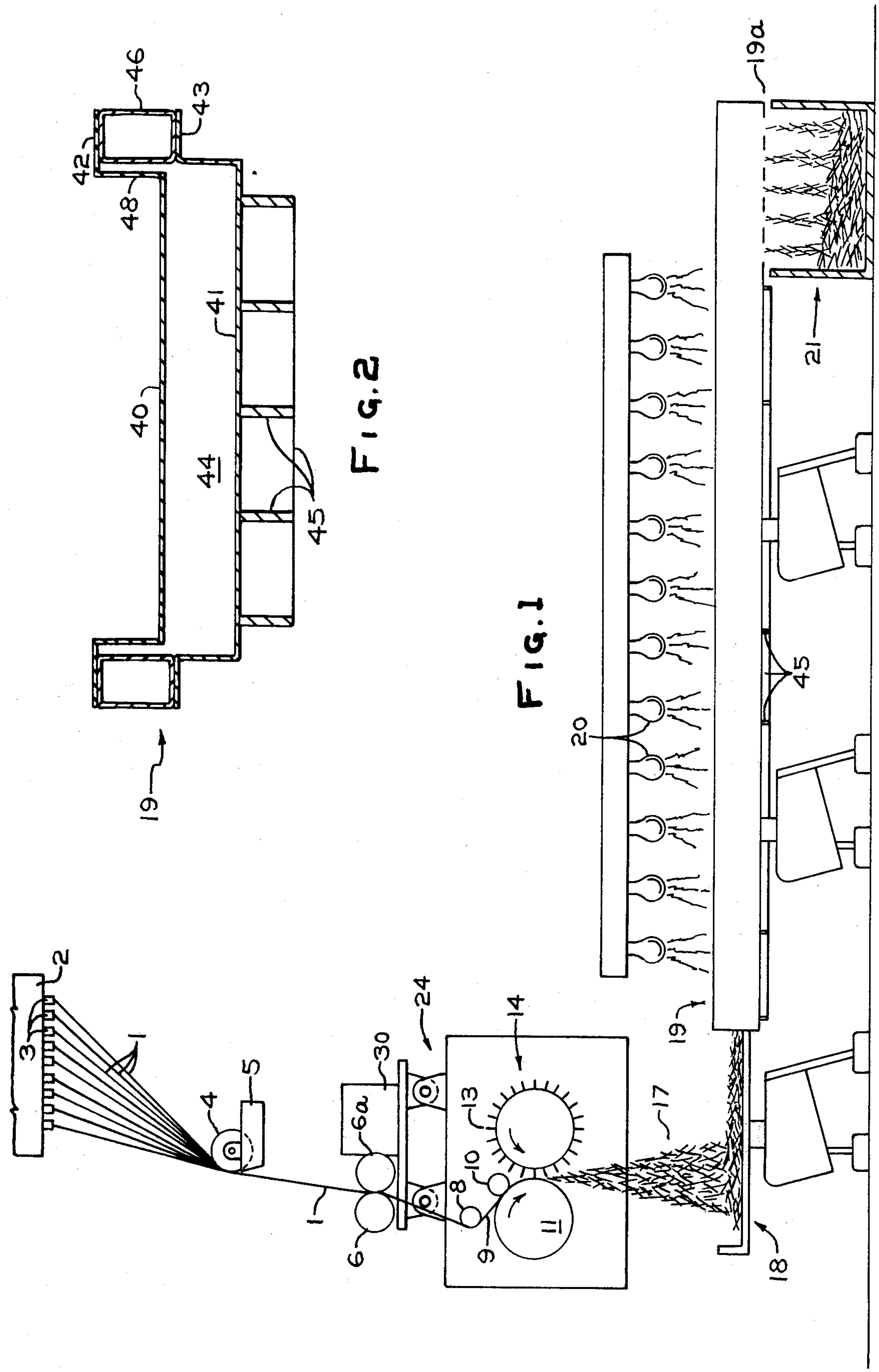
FIG. 1 is a diagrammatic representation of the formation of chopped glass fiber strand according to the present invention.
FIG. 2 is a cross sectional view of the improved conveying tray of the present invention.

Referring now to FIG. 1, glass filaments 1 are attenuated from tips or orifices 3 in a bushing 2. The fibers 1 are coated with a lubricant binder and/or size prior to contacting each other to prevent abrasion of the filaments against each other and breakage of filaments. A major advantage of the present invention is that any of the well-known binders and/or sizes may be employed in the instant invention. The lubricant composition is applied by passing filaments 1 over an applicator 4 which may be a roller applicator, belt applicator, or the like which is immersed in a bath 5 of the lubricant composition. The bath 5 is usually fed by pumping the lubricant composition from a hold tank, not shown, to the bath 5.

The filaments 1 are passed through a pair of start-up rolls, or pull rolls 6 and 6a which attenuate the fibers 1 at a low speed to begin the fiber forming process. While the pull rolls 6 and *6a* are in operation, glass fibers being formed are disposed of by means of a waste chute, not shown in FIG. 1. When the process is begun, the glass fibers 1 being formed are placed through a guide or gathering shoe 8, which is generally a grooved cylinder, which gathers the filaments 1 together and forms them into the desired number of strands 9. The gathering shoe 8 traverses through a small distance of travel across the base of wheel 11 by a traversing means not shown in FIG. 1.

The strands 9 are passed through a free wheeling feed roll 10 which aligns the strands 9 for the cutting action. The feed roll 10 has a narrow knurled surface to provide tractive force between the strands 9 and the roll 10.

Feed roll 10 is in contact with a cot roll or backup roll 11. Having the strand 9 in contact with both rolls 10 and 11 provides the attenuation necessary to form fibers 1. Generally the fibers 1 are attenuated at speeds of from about 2,000 to 3,000 feet per minute (609.6 to 914.4 meters per minute) though greater speeds may be employed.

The strand 9 is passed between the cot roll 11 and the cutting edges 13. The cutting edges 13 are mounted in grooves on the cutter head 14, said head having a plurality of grooves, not shown, in FIG. 1, oriented traversely and oblique with the axis of the cutter head 14.

Thus, the strands 9 are formed in the traversing gathering shoe 8 and attenuated by the feed roll 10 contacting the cot roll 11 with the strand 9 pulled between the rolls 10 and 11. The strand 9 is then chopped by the blades 13 while contacting the cot roll 11.

The chopped strands 17 then fall onto a first vibratory conveyor 18, which agitates the chopped strand 17 which typically has a moisture content from about 9 to 11 percent by weight due to the aqueous size previously applied. The vibratory action maintains the chopped strand 17 in discrete glass fiber bundles rather than having the bundles adhering to each other.

The chopped strand 17 is passed from the vibratory conveyor 18 to a second vibratory conveyor 19 having an amplitude of vibration less than the first vibratory conveyor 18. Associated with the second vibratory conveyor 19 is a heating zone, in this case a plurality of infrared bulbs 20. As the chopped strand 17 is conveyed along the second conveyor 19, it is reduced in moisture content to less than 0.1 percent by weight by the applied heat. Means other than the infrared bulbs 20 may be used to supply the heat for moisture reduction, such as a forced air oven or the like. The portion 19*a* of the second conveyor 19 is foraminous in order that proper length dried chopped strand 17 falls through the aperatures in the conveyor and into a collection package 21. Oversized material is removed at the end of the conveyor.

Referring now to FIG. 2, the second vibratory conveyor or tray 19 is shown in cross section. As can be seen in this Figure, the tray 19 comprises two sections 40 and 41. Between the two sections 40 and 41 along their lengths is an airspace 44. The lips 42 of the upper tray and 43 of the lower tray have spacers 46 therebetween. These spacers provide the requisite air space between the two sections. These spacers 46 are the only connection between the two sections 40 and 41. The spacers 46 are formed of ceramic, metal, or the like. They are spaced from the side 48 of the upper tray to prevent heat conduction through the spacer 46. Under the second section 41 are a series of reinforcing ribs 45. The air space 44 insulates the upper section 40 from the reinforcing ribs 45 attached to the lower section 41. The air space between the upper section and lower section is preferably about 1.25 inch (3.18 centimeters). However this distance is not critical as long as the required insulation properties are obtained.

EXAMPLE

Using apparatus as illustrated in FIG. 1, K-6.75 glass strand was attenuated at a speed of 2,500 feet per minute (762 meters per minute) and chopped into fibers having a length of 0.125 inch (0.318 centimeters). The air space between sections of the tray 19 was 1.25 inches (3.18 centimeters). The temperature at the center of the upper section 41 of the tray 19 was 200° F. (93.3° C.). No sticking of fibers due to heat sinks along the tray was noticed during a run of 168 hours.

While the present invention has been described with reference to specific embodiments, it is not intended to be so limited except insofar as in the appended claims.

We claim:

1. In the method of heating and drying chopped glass fibers having a binder and/or size thereon having a tendency to stick to a conveying surface when collected comprising passing said chopped glass fibers onto a 2-stage vibratory conveyor, vibrating a first stage of said conveyor to propel said fibers along the first stage of said conveyor, vibrating a second stage of the conveyor at a lower amplitude than said first stage, heating and drying said fibers during their passage along said conveyor and collecting the resulting fibers, the improvement comprising: insulating said second stage of said conveyor to prevent cold spots along the length of said second stage to thereby prevent sticking of said chopped glass fibers on the surface of said second stage of said conveyor.

2. The method of claim 1 wherein said insulating comprises forming said second stage of said conveyor of two sections, one inside the other, each section having lips along their lengths and spacers between said lips to provide an airspace between said sections along their lengths.

3. The method of claim 2 wherein said air space is about 1.25 inches (3.18 centimeters).

4. The method of preparing chopped glass fiber strand comprising forming a plurality of continuous glass filaments from a glass fiber bushing, applying a binder and/or size to the filaments, consolidating said filaments into one or more continuous glass fiber strands, passing said glass fiber strand or strands into an attenuation zone, attenuating said glass fiber strand or strands and the filaments associated therewith in said zone, passing the glass fiber strand or strands through a cutting zone and cutting said glass fiber strand or strands into discrete lengths, said discrete lengths of glass fiber strand having a tendency to stick to a conveyor surface, passing the said discrete lengths of glass fiber strands onto a 2-stage vibratory conveyor, vibrating a first stage of said conveyor to propel said discrete lengths of glass fiber strand along the first stage of said conveyor, vibrating a second stage of said conveyor at a lower amplitude than said first stage of said conveyor, heating and drying said discrete lengths of glass fiber strands during their passage along said conveyor, insulating said second stage of said conveyor to prevent cold spots along the length of the passage of said discrete length of strands to thereby prevent sticking of said discrete length of strands to said second stage of said conveyor, and collecting the resulting glass fiber strands.

5. The method of claim 4 wherein said insulating comprises forming said second stage of said conveyor of two sections, one inside the other, each section having lips along their lengths, and spacers between said lips to provide an airspace between said sections along their lengths.

6. The method of claim 5 wherein said air space is about 1.25 inches (3.18 centimeters).

7. Apparatus for drying and conveying chopped glass fiber strands having a binder and/or size thereon having a tendency to stick to a conveyor when collected comprising a 2-stage vibratory conveyor, means to vibrate a first stage at a higher amplitude than the second stage, and heating means located above the second stage to heat and dry the strand, said second stage comprising two trays, one positioned above the other, sidewalls of each try having horizontally extending lips, spacing means positioned between the lips of the two trays on each side thereof and arranged such that the upper tray is supported in spaced relation from the lower tray by said spacing means to thereby define an airspace between the trays along their length to prevent cold spots along the upper tray of the second stage and thereby prevent sticking of said strands to said second stage.

8. The apparatus of claim 7 wherein the second stage further comprises a foraminous portion at the end thereof to selectively isolate the preferred lengths of said glass fiber strands.

9. The apparatus of claim 8 wherein said air space is about 1.25 inches (3.18 centimeters).

* * * * *